(12) United States Patent
Wei et al.

(10) Patent No.: US 11,071,044 B2
(45) Date of Patent: Jul. 20, 2021

(54) MOBILE TELECOMMUNICATIONS SYSTEM ENTITY FOR TRANSMITTING SYSTEM INFORMATION IN A 5G NETWORK

(71) Applicant: Sony Corporation, Tokyo (JP)

(72) Inventors: Yuxin Wei, Basingstoke (GB); Brian Alexander Martin, Basingstoke (GB); Vivek Sharma, Basingstoke (GB); Hideji Wakabayashi, Basingstoke (GB); Shinichiro Tsuda, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 81 days.

(21) Appl. No.: 16/343,793

(22) PCT Filed: Oct. 26, 2017

(86) PCT No.: PCT/EP2017/077531
§ 371 (c)(1),
(2) Date: Apr. 22, 2019

(87) PCT Pub. No.: WO2018/078060
PCT Pub. Date: May 3, 2018

(65) Prior Publication Data
US 2019/0281535 A1    Sep. 12, 2019

(30) Foreign Application Priority Data

Oct. 28, 2016   (EP) .................................. 16196249

(51) Int. Cl.
*H04W 48/12*   (2009.01)
*H04W 48/14*   (2009.01)
(Continued)

(52) U.S. Cl.
CPC ........... *H04W 48/12* (2013.01); *H04W 48/14* (2013.01); *H04W 48/16* (2013.01); *H04W 72/1289* (2013.01)

(58) Field of Classification Search
None
See application file for complete search history.

(56) References Cited

U.S. PATENT DOCUMENTS

2007/0260851 A1*  11/2007  Taha ................. H04W 52/0229
                                                                 712/204
2011/0173249 A1*   7/2011  Lee .................... H04W 72/005
                                                                 709/203
(Continued)

FOREIGN PATENT DOCUMENTS

WO        2008/044664 A1     4/2008

OTHER PUBLICATIONS

International Search Report and Written Opinion dated Mar. 19, 2018 for PCT/EP2017/077531 filed on Oct. 26, 2017, 24 pages.
Huawei et al., "Delivery of "Other SI" in NR", 3GPP TSG-RAN2 Meeting No. 95bis R2-166203, Kaohsiung, Oct. 10-14, 2016, 5 pages.

(Continued)

*Primary Examiner* — Diane L Lo
(74) *Attorney, Agent, or Firm* — Xsensus LLP

(57) ABSTRACT

A mobile telecommunications system entity for a mobile telecommunications system has at least one entity, which serves at least one user equipment. The mobile telecommunications system entity has circuitry which is configured to transmit scheduling information for on-demand system information, which can be requested by the at least one user equipment.

19 Claims, 6 Drawing Sheets

(51) Int. Cl.
  *H04W 48/16* (2009.01)
  *H04W 72/12* (2009.01)

(56) References Cited

U.S. PATENT DOCUMENTS

2016/0234736 A1* 8/2016 Kubota ............... H04B 7/0413
2017/0311254 A1* 10/2017 Ly ..................... H04W 52/0203

OTHER PUBLICATIONS

Catt, "On-demand system Information Delivery Mechanism", 3GPP TSG RAN WG2 Meeting No. 95 R2-164811, pp. 1-6.

Sharp, "NR system Information Areas for Other SI", 3GPP TSG RAN WG2 Meeting No. 95bis R2-166353, Kaohsiung, Taiwan, Oct. 10-14, 2016, pp. 1-4.

3GPP, "3rd Generation Partnership Project; Technical Specification Group Radio Access Network; Evolved Universal Terrestrial Radio Access (E-UTRA); Radio Resource Control (RRC); Protocol specification", Release 14, 3GPP TS 36.331 V14.0.0, Sep. 2016, pp. 1-644.

ETSI MCC, "Draft Report of 3GPP TSG RAN WG2 meeting No. 95bis", 3GPP TSG-RAN Working Group 2 meeting No. 96, R2-16xxx, Reno, Nevada,US, Nov. 14-18, 2016, pp. 1-195.

Samsung, "Report of Email discussion: [95 # 29] [NR] on demand SI", 3GPP TSG-RAN WG295bis R2-166497, Kaohsiung, Taiwan, Oct. 10-14, 2016, pp. 1-20.

Samsung, "Report of Email discussion on [94 # 40] [NR] System information", 3GPP TSG-RAN WG2 95, R2-165201 Gothenburg, Sweden, Aug. 22-26, 2016, pp. 1-31.

Catt, "System Information Area", 3GPP TSG RAN WG2 Meeting No. 95 R2-164809, Gothenburg, Sweden, Aug. 22-26, 2016, pp. 1-5.

* cited by examiner

US 11,071,044 B2

MOBILE TELECOMMUNICATIONS SYSTEM ENTITY FOR TRANSMITTING SYSTEM INFORMATION IN A 5G NETWORK

CROSS-REFERENCE TO RELATED APPLICATIONS

The present application is based on PCT filing PCT/EP2017/077531, filed Oct. 26, 2017, which claims priority to EP 16196249.3, filed Oct. 28, 2016, the entire contents of each are incorporated herein by reference.

TECHNICAL FIELD

The present disclosure generally pertains to mobile telecommunications system entities.

TECHNICAL BACKGROUND

Several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

A candidate for providing the requirements of 5G is the so called Long Term Evolution ("LTE"), which is a wireless communication technology allowing high-speed data communications for mobile phones and data terminals and which is already used for 4G mobile telecommunications systems. Other candidates for meeting the 5G requirements are termed New Radio Access Technology Systems (NR). An NR can be based on LTE technology, just as LTE was based on previous generations of mobile communications technology.

LTE is based on the GSM/EDGE ("Global System for Mobile Communications"/"Enhanced Data rates for GSM Evolution" also called EGPRS) of the second generation ("2G") and UMTS/HSPA ("Universal Mobile Telecommunications System"/"High Speed Packet Access") of the third generation "3G") network technologies.

LTE is standardized under the control of 3GPP ("3rd Generation Partnership Project"). There exists a successor LTE-A (LTE Advanced) allowing higher data rates as the basis LTE which is also standardized under the control of 3GPP.

For the future, 3GPP plans to further develop LTE-A, such that it will be able to fulfill the technical requirements of 5G.

As the 5G system will be based on LTE or LTE-A, respectively, it is assumed that specific requirements of the 5G technologies will, basically, be dealt with by features and methods which are already defined in the LTE and LTE-A standard documentation.

5G technologies will allow a concept of a so called "virtual cell" or "local cell" or the like, which may also be based on NR. In this concept, a cell is served by a user equipment ("UE"), e.g. a mobile phone, a computer, tablet, tablet personal computer or the like including a mobile communication interface, or any other device which is able to perform a mobile telecommunication via, for example, LTE(-A), such as a hot spot device with a mobile communication interface. In short, the UE works dynamically as an intermediate node for establishing an indirect network connection between other UEs in the vicinity of the virtual cell or local cell and the network, and/or as an intermediate node between UEs. A function of the intermediate node on the UE may also be carried out by "virtualization". A virtual cell or local cell may communicate with UEs in unlicensed, shared licensed or licensed bands, and it backhauls to network preferably in licensed bands.

A logical separation between control plane and user plane has been achieved in accordance with the introduction of the IP Multimedia System (IMS) for LTE, and a physical separation between control plane and user plane has been proposed as a possible solution for 5G or NR. Since requirements for the control plane should be basically robustness and wide coverage so as to maintain the service continuity, a macro or anchor entity (e.g. base station or Evolved Node B) should provide a link of the control plane. On the other hand, a key performance of the user plane is the efficient spectrum usage in order to improve the cell capacity. However, since the requirements of the user plane are highly depending on specific use case or UE capability/category, a variety of types of reception/transmission or routing methods are considered according to the respective use case or UE capability/category taking into account a concept for 5G such as "network slicing".

For the 5G technologies, it is envisaged that a UE or other NR stations in the function as a virtual cell, local cell, micro or pico cell, Transmission/Reception Point (TRP) or the like should be able to take over responsibilities, which are typically handled, for example, in a base station, or eNodeB (Evolved Node B) as it is called in LTE (the eNodeB is the element in the evolved UTRA of LTE, the UTRA being the UMTS Terrestrial Radio Access). Such responsibilities, which are envisaged to be performed in the UE as a virtual cell or the other NR stations or entities mentioned above, are, for example, radio resource management, radio resource control (RRC), connection control, etc.

However, although there exist signaling techniques for the 5G technologies, it is generally desirable to improve the signaling.

SUMMARY

According to a first aspect, the disclosure provides a mobile telecommunications system entity for a mobile telecommunications system including at least one entity serving at least one user equipment, comprising circuitry configured to transmit scheduling information for on-demand system information, which can be requested by the at least one user equipment.

According to a second aspect, the disclosure provides a mobile telecommunications system entity for a mobile telecommunications system including at least one entity serving at least one user equipment, comprising circuitry configured to transmit, in response to a request for system information from a user equipment, indication information indicating to the user equipment to receive broadcast information.

According to a third aspect, the disclosure provides a mobile telecommunications system entity for a mobile telecommunications system including at least one entity serving at least one user equipment, comprising circuitry configured to transmit, in response to a request for system information from a user equipment, scheduling information to the user equipment.

According to a fourth aspect, the disclosure provides a mobile telecommunications system entity for a mobile telecommunications system including at least one entity serving at least one user equipment, comprising circuitry configured to transmit over a broadcast channel, in response to a request for system information from a user equipment, indication information indicating to the user equipment to receive scheduling information.

According to a fifth aspect, the disclosure provides a mobile telecommunications system entity for a mobile telecommunications system including at least one entity serving at least one user equipment, comprising circuitry configured to receive a system information request from the at least one user equipment and receive at least one of: channel quality, coverage and block error rate information; and adjust at least one of redundancy level, periodicity of transmission, transmission start point and boost with beamforming for the at least one user equipment.

According to a sixths aspect, the disclosure provides a mobile telecommunications system anchor entity including at least one entity serving at least one user equipment, the anchor entity comprising circuitry configured to transmit scheduling information for on-demand system information, which can be requested by the at least one user equipment and which is transmitted by the at least one entity serving the at least one user equipment.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
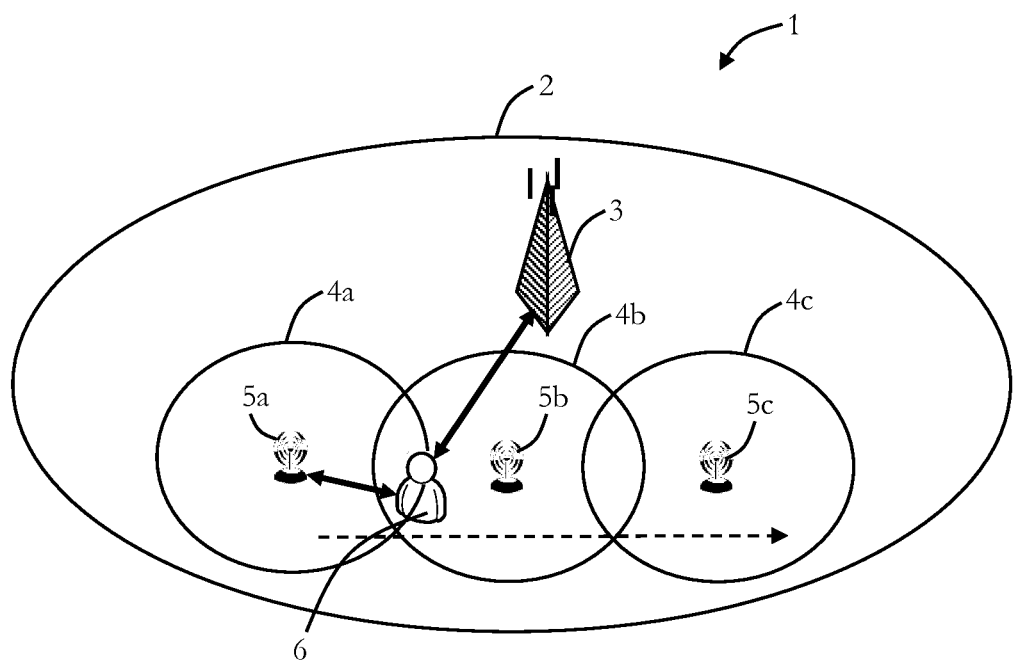
FIG. 1 illustrates a radio access network including an LTE cell and NR cells.

Before a detailed description of the embodiments under reference of FIG. 1, general explanations are made.

As mentioned in the outset, in general, several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

A candidate for providing the requirements of 5G is the so called Long Term Evolution ("LTE"), which is a wireless communication technology allowing high-speed data communications for mobile phones and data terminals and which is already used for 4G mobile telecommunications systems.

Other candidates for meeting the 5G requirements are termed New Radio Access Technology Systems (NR). An NR can be based on LTE technology, just as LTE was based on previous generations of mobile communications technology.

LTE is based on the GSM/EDGE ("Global System for Mobile Communications"/"Enhanced Data rates for GSM Evolution" also called EGPRS) of the second generation ("2G") and UMTS/HSPA ("Universal Mobile Telecommunications System"/"High Speed Packet Access") of the third generation "3G") network technologies.

LTE is standardized under the control of 3GPP ("3rd Generation Partnership Project"). There exists a successor LTE-A (LTE Advanced) allowing higher data rates as the basis LTE which is also standardized under the control of 3GPP.

For the future, 3GPP plans to further develop LTE-A, such that it will be able to fulfill the technical requirements of 5G.

As the 5G system will be based on LTE or LTE-A, respectively, it is assumed that specific requirements of the 5G technologies will, basically, be dealt with by features and methods which are already defined in the LTE and LTE-A standard documentation.

5G technologies will allow a concept of a so called "virtual cell", "local cell", "distributed unit", "TRP (Transmission/Reception Point)" or the like, which may also be based on NR. In this concept, a cell is served by a user equipment ("UE"), e.g. a mobile phone, a computer, tablet, tablet personal computer or the like including a mobile communication interface, or any other device which is able to perform a mobile telecommunication via, for example, LTE(-A), such as a hot spot device with a mobile communication interface. In short, the UE works dynamically as an intermediate node for establishing an indirect network connection between other UEs in the vicinity of the virtual cell or local cell and the network, and/or as an intermediate node between UEs. A function of the intermediate node on the UE may also be carried out by "virtualization". A virtual cell, local cell, "distributed unit" or "TRP (Transmission/Reception Point)" may communicate with UEs in unlicensed, shared licensed or licensed bands, and it backhauls to network preferably in licensed bands.

A logical separation between control plane and user plane has been achieved in accordance with the introduction of the IP Multimedia System (IMS) for LTE, and a physical separation between control plane and user plane has been proposed as a possible solution for 5G or NR. Since requirements for the control plane should be basically robustness and wide coverage so as to maintain the service continuity, a macro or anchor entity (e.g. base station or Evolved Node B) should provide a link of the control plane. On the other hand, a key performance of the user plane is the efficient spectrum usage in order to improve the cell capacity. However, since the requirements of the user plane are highly depending on specific use case or UE capability/category, a variety of types of reception/transmission or routing methods are considered according to the respective use case or UE capability/category taking into account a concept for 5G such as "network slicing".

For the 5G technologies, it is envisaged that a UE or other NR stations in the function as a virtual cell, local cell, micro or pico cell, Transmission/Reception Point (TRP) or the like should be able to take over responsibilities, which are typically handled, for example, in a base station, or eNodeB (Evolved Node B) as it is called in LTE (the eNodeB is the element in the evolved UTRA of LTE, the UTRA being the UMTS Terrestrial Radio Access). Such responsibilities, which are envisaged to be performed in the UE as a virtual cell or the other NR stations or entities mentioned above, are, for example, radio resource management, radio resource control (RRC) connection control, etc.

As mentioned, the new Radio Access Technology (RAT) developed for 5G, called New Radio (NR), may be used in local cells and virtual cells in some embodiments, but there may also be small cells provided by NR eNodeBs and may be TRPs.

In 3GPP document R2-164809, "System Information Area", 3GPP TSG RAN WG" Meeting #95, Gothenburg, Sweden, 22-26 Aug. 2016, four scenarios are listed for an NR system information enhancement study and, moreover, a concept of a system information area is introduced.

The system Information Area (SIA) may be, in some embodiments, an area where all TRP/beams in the SIA are configured with at least some common essential system information (SI) and possibly part of non-essential SI which is broadcasted. In some embodiments, if this includes System Frame Number then all TRPs in the same SIA are synchronized. The broadcast can be handled by each TRP individually (single frequency network (SFN) transmission if synchronized), and/or via overlaid node(s) (e.g. LF macro), and/or a combination of local TRP broadcast and coverage overlaid node(s) e.g. different SI-Y broadcasted locally by each TRP and other common essential SI (SI-X)+non-essential SI which is broadcasted over overlaid node(s) (wherein SI-X is defined in R2-164809 as common part across an area involving potentially multiple TRP/beams that can be acquired early, and SI-Y as TRP/beam-specific part that may be acquired only before performing RACH).

Alternatively or additionally, the SIA may be a set of potentially different essential SIs used by different TRPs in the SIA commonly broadcasted by overlaid node(s) (e.g. LF macros) over the SIA coverage.

In a 3GPP RAN2 #95b meeting, the following agreements on NR system information have been made, which are, thus, covered in some embodiments:

For on demand system information (SI), other SIs may be broadcasted at configurable periodicity (equivalent to SI period in LTE) and for a certain duration.

Request of the other SI by idle and "new state" UE should be performed without state transition.

For a SI required by the UE, the UE should know, whether the SI is available in the cell and whether the SI is broadcasted or not before it sends another SI request (e.g. by checking minimum SI).

In addition to basic information for initial access to the cell, minimum SIs should include the scheduling information for broadcasted Sis.

Public Warning System (PWS) information can be classified into other SI. For further study whether this PWS would need additional enhancements.

Moreover, it is for further study, whether the minimum SIs is broadcasted periodically in every cell on which a UE can camp, and whether there are cells in the system where the UE cannot camp, and, thus, some embodiments pertain also to this issue.

Some embodiments, address at least some of the following issues, namely e.g. how to notify the on-demand SI broadcast information and how to design the scheduling information by considering the deployment scenario with and without anchor SI entity.

In some embodiments, for scheduling information transmission, the following aspects are addressed.

Some embodiments provide a solution for transmitting scheduling information in a broadcast manner and, for example, provide solutions for implementations using a separated transmission of scheduling information, e.g. a two-stage (or multi-stage) scheduling information transmission, which take the trade-off between control signaling overhead and scheduling flexibility into account. Some embodiments also provide solutions for UEs which may miss the scheduling information. Some embodiments provide solutions for the network, e.g. eNodeB (LTE, NR or the like), where an anchor SI entity is used and for networks where no anchor SI entity is used, as will also discussed further below.

In some embodiments, a system information area is composed of one or more entities (e.g. LTE and/or NR eNodeB, LTE/NR central units (CU), LTE/NR distributed units (DU), LTE/NR Transmit and Receive Point (TRP), or the like). Within such a system information area, the system information (or minimum system information which may only include basic information, such as cell access information, cell select information, information for acquiring other SI (everything not in minimum SI) and the like) would be the same or different among different entities. The minimum system information may further include information about entities within the system information area. This information can be provided, for example, by a list including identification numbers or the like of entities within the same system information area.

In some embodiments, each system information area will have a unique identifier and this identifier will be used by the UE to judge whether it moves to a new system information area or not. In some embodiments, the system information area is introduced, when anchor entity or anchor cell (or two or more anchor entities/cells) are provided. A system information area may be an aggregation of one or more entities, wherein among these entities one or more anchor cells (anchor entities) are provided which collect system information and/or scheduling information of other entities and send the collected system and/or scheduling information to the UEs on behalf of these other entities, as will also be discussed further below.

In general, in this disclosure, entities, such as a base station, eNodeB, etc., as mentioned, may be based on the principles of LTE (LTE-A) and/or be based on NR RAT, as also discussed above. The entity may be based on the known eNodeB of LTE, as one example, or it may be based on the discussed NR eNodeB.

A user equipment, as discussed herein, may be, for example, a mobile phone, smartphone, a computer, tablet, tablet personal computer or the like including a mobile communication interface, or any other device which is able to perform a mobile telecommunication via, for example, LTE or NR, such as a hot spot device with a mobile communication interface, etc.

A circuitry as discussed herein may include at least one of: processor, microprocessor, dedicated circuit, memory, storage, radio interface, wireless interface, network interface, or the like, e.g. typical electronic components which are included in a base station, such as an eNodeB.

An (anchor) entity may provide a respective (anchor) cell, as it is generally known. The mobile telecommunications system discussed herein may be LTE based and/or NR based. In particular, it may be a mixture of LTE and NR.

Some embodiments, where for example no anchor entity is used for transmission of scheduling information, pertain to a mobile telecommunications system entity for a mobile telecommunications system including at least one entity serving at least one user equipment, comprising circuitry configured to transmit scheduling information for on-demand system information, which can be requested by the at least one user equipment. The transmitting, as used herein, may include broadcasting and/or unicasting.

It is noted that the scheduling information in this disclosure may also be broadcasted/unicasted in the embodiments discussed in the present disclosure.

The on-demand system information may be information, which is not included in the minimum system information as mentioned above.

Hence, in some embodiments, the scheduling information for the on-demand system information may be broadcasted by all entities or the entity who will be responsible to transmit the on-demand system information, e.g. NR and/or LTE eNodeBs.

The circuitry may be further configured to transmit the scheduling information with a predetermined periodicity, predetermined duration, and/or at a predetermined transmission time.

The circuitry may be further configured to transmit the scheduling information included in system information. For example, the scheduling information may be included in a master information block (MIB) of the system information. The scheduling information may be included in a system information block (SIB) of the system information.

System information is typically a type of control information. In the current LTE, the system information is broadcasted in so called System Information Blocks (SIB), which are, for example:

MIB (Master Information Block): physical layer information of a LTE cell, e.g. transmission bandwidth configuration, system frame number etc.

SIB1: information regarding whether or not UE is allowed to access the LTE cell, defines scheduling of the other SIBs, and carries cell ID, SIB mapping information, etc.

SIB2: common channel and shared channel information There exist further blocks, e.g. SIB4 to SIB19 in LTE, which are generally known.

Hence, it is assumed that a similar system information structure will also be applied in further LTE and also in NR.

In some embodiments, the scheduling information is divided at least in a first part and a second part.

The first part may include information about a time schedule according to which the second part is transmitted.

The first part may be included in a master information block of system information and the second part may be included in a system information block of system information.

The first part may indicate a time schedule according to which system information block information is transmitted and/or going to be transmitted.

Hence, in some embodiments the UE may decide on the basis of the information in the master information block, whether the other system information is needed, and whether it wants to read the second part of the scheduling information.

The first part may indicate a time schedule for bits in the system information block.

As another example, the first part may indicate a time schedule for bits of group of system information blocks, e.g. service specific system information block group, cell selection/reselection system information block group, mobility system information block group etc.

The circuitry may be further configured to transmit information indicating, whether the system information is addressed to all user equipments or to specific user equipments. Also here, the UE can decide whether it needs the system information or not.

The circuitry may be further configured to transmit information indicating a change of a system information block. This information may be included in a master information block.

The circuitry may be further configured to transmit information, whether the change of the system information block is addressed to all user equipments or to specific user equipments.

The scheduling information may be transmitted within a system information block.

Some embodiments, pertain to a mobile telecommunications system entity for a mobile telecommunications system including at least one entity serving at least one user equipment, comprising circuitry configured to transmit, in response to a request for system information from a user equipment, indication information indicating to the user equipment to receive broadcast information.

Thereby, it can be ensured that the UE tries to receive scheduling information for receiving system information instead of continuously requesting on-demand system information. The broadcast information may include scheduling information.

The indication information may be transmitted based on a connection state of the user equipment. For instance, the indication information is transmitted in a radio resource control (RRC) message, when the user equipment is in a radio resource control (RRC) connected state. The indication information may also be transmitted in a random access channel (RACH) message, when the user equipment is in a radio resource control (RRC) inactive state or in a radio resource control (RRC) idle state.

Some embodiments pertain to a mobile telecommunications system entity for a mobile telecommunications system including at least one entity serving at least one user equipment, comprising circuitry configured to transmit, in response to a request for system information from a user equipment, scheduling information to the user equipment.

Some embodiments pertain to a mobile telecommunications system entity for a mobile telecommunications system including at least one entity serving at least one user equipment, comprising circuitry configured to transmit over a broadcast channel, in response to a request for system information from a user equipment, indication information indicating to the user equipment to receive scheduling information.

The broadcast channel may be addressed, based on a radio access network (RAN) area or the broadcast channel may be addressed in a master information block.

The circuitry may be further configured to transmit information, which indicates to the at least one user equipment to read the scheduling information.

Some embodiments pertain to a mobile telecommunications system entity for a mobile telecommunications system including at least one entity serving at least one user equipment, comprising circuitry configured to receive a system information request from the at least one user equipment and receive at least one of: channel quality, coverage and block error rate information; and adjust at least one of redundancy level, periodicity of transmission, transmission start point and boost with beamforming for the at least one user equipment.

Some embodiments pertain to a mobile telecommunications system anchor entity including at least one entity serving at least one user equipment, the anchor entity comprising circuitry configured to transmit scheduling information for on-demand system information, which can be requested by the at least one user equipment and which is transmitted by the at least one entity serving the at least one user equipment.

Hence, in these embodiments, the anchor entity transmits, for example, minimum system information, wherein another entity, which may not be an anchor entity, transmits the on-demand system information.

The circuitry may be further configured to transmit the scheduling information with a predetermined periodicity, a predetermined duration and/or at a predetermined transmission time.

The circuitry may be further configured to transmit indication information that the scheduling information for the at least one entity serving the at least one user equipment is included in system information.

The indication information may be included in a master information block of the system information.

The scheduling information may be included in a system information block of the system information.

The scheduling information may be divided at least in a first part and a second part.

The first part may include information about a time schedule according to which the second part is transmitted.

The first part may be included in a master information block of system information and the second part may be included in a system information block of system information.

The first part may indicate a time schedule according to which system information block information is transmitted.

The first part may indicate a time schedule for bits in the system information block.

The scheduling information may be transmitted over a broadcast channel of the anchor entity, the broadcast channel having a predefined identifier.

The predefined identifier may be a system information area identifier.

All user equipments within the system information area may have a common identifier and the scheduling information may be directed to the user equipments having the common identifier.

Returning to FIG. 1, there is illustrated a RAN 1 which has a macro cell 2, which is established by a LTE eNodeB 3, which may also be exemplary an anchor entity. Moreover, three pico cells 4a, 4b and 4c are provided, which are each established by an NR eNodeB 5a, 5b and 5c, respectively. The NR cells 4a-c may also include more than one TRP/DU (transmission reception point/distributed unit) connected to a single CU (central unit).

A UE 6 can communicate with the LTE eNodeB 3 and, as long it is within one of the pico cells 4a, 4b and 4c, respectively, it can also communicate with the associated NR eNodeB 5a, 5b and 5c, respectively.

In this embodiment, the LTE eNodeB 3 and the NR eNodeBs 5a, 5b and 5c may form a system information area, as also discussed above. The system information area may have a specific identifier, on the basis of which the system information area can be identified.

The UE 6 may travel around (see dashed arrow), and in this simple mobility scenario, the UE 6 remains under the coverage of the same LTE cell 2, while passing through the coverage of multiple NR small cells, such as the three NR cells 4a-c.

In the following, embodiments are discussed, where no entity having an anchor function for transmission of system information is provided.

For the system information provision (SI) without anchor SI entity, each entity/cell, e.g. LTE eNodeB 3 and NR cells 4a-c will broadcast system information including minimum SI and other SI (or on-demand SI) by itself.

In general, in some embodiments, the scheduling information of the broadcast of other SI will include the following: periodicity (e.g. 80 ms, 160 ms), duration (number of periodicity, e.g. 1, 2 or 4 periodicity) and potentially transmission time (transmission start point).

For instance, in the case that the other system information is not urgently demanded, there may exist a notification period of broadcasted other SI. Such a notification period can be pre-defined or indicated, and may be changed, in the MIB. Then, the transmission time can indicate after which amount of notification period, the SI will start to be transmitted. The start of transmission of the SI may also be indicated in other forms, as will become apparent from the following description.

Currently, there is no definition on how to transmit minimum SI in NR. For instance, as also discussed above, in LTE there is a MIB which will be transmitted in broadcast channel PBCH (physical broadcast channel) and SIBx which is be transmitted in a shared channel PDSCH (physical downlink shared channel).

For NR, there may be a separated transmission of minimum SI on broadcast channel and shared channel, then the following embodiments for transmitting the scheduling information may be supported.

Figure 2:
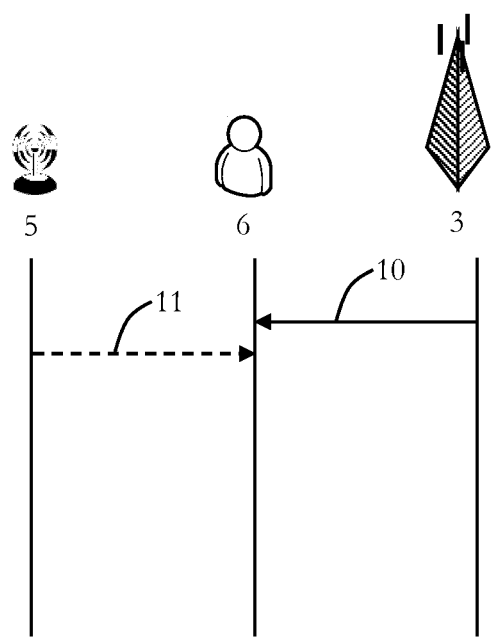
FIG. 2 illustrates a transmission scheme for system information and scheduling information.

As also illustrated in FIG. 2, in an embodiment, the scheduling information of on-demand SI will be included in the MIB-like system information, which is transmitted at 10 by the LTE eNodeB 3 and at 11 by the NR eNodeB 5 and is received by the UE accordingly.

In this embodiment, for every possible SIBs which will be allowed to be transmitted in an on-demand manner, a scheduling list is provided for each of them (SIBs) and their corresponding scheduling information is also provided, even though some bits of the SIBs will not be scheduled to be broadcasted. Further optimizations can be considered to minimize the message size. In some embodiments, it is the fasted way to get the corresponding scheduling information at the cost of increased MIB-like size.

Although, the embodiment has been illustrated exemplary on the basis of a MIB, in more general, the system information may be always transmitted with pre-defined period, with fixed resource allocation, and potentially with fixed size. Moreover, this may also be used for the minimum SI.

Figure 3:
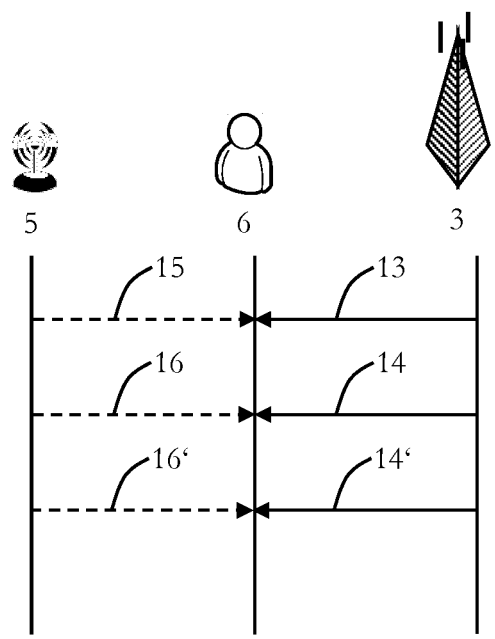
FIG. 3 illustrates a transmission scheme for system information and scheduling information.

As also illustrated in FIG. 3, in a further embodiment, a (first) part of scheduling information of on-demand SI will be included in the MIB-like system information and the other (second) part or the other parts of the scheduling information are included in the SIB1-like system information.

For instance, the MIB-like system information is transmitted at 13 by the LTE eNodeB 3 and at 15 by the NR eNodeB 5, whereas the SIB1-like system information is transmitted at 14 by the LTE eNodeB 3 and at 16 by the NR eNodeB 5.

For example, a bit map will be included in the MIB-like SI to indicate which SIBs will be broadcasted soon and the detailed scheduling information will be indicated in the SIB1-like SI.

In this embodiment, the UEs will get information of SIBs/SI messages to be broadcasted and decide whether to receive the corresponding scheduling information by itself. Hence, the UE 6 will decide, whether it receives the messages transmitted at 14 and 16.

This embodiment takes characteristics of on-demand SI transmission into account. Not all of the UEs are interested in all of the on-demand SI transmission. If certain UEs can get the scheduling information of its interested SI in MIB in advance, it can decide to read the following detailed scheduling information otherwise it just ignores the scheduling information. Hence, this embodiment, considers the trade-off between the control signaling overhead in MIB-like SI and scheduling flexibility.

As another example, the other SI can be further divided into other SI for all UEs and other SI for certain UEs. Then, for example, the bit map will be separated accordingly, e.g. into an ALL-UE-SIB-BITMAP and SOME-UE-SIB-BITMAP.

If a SIB, which is provided for all the UEs, will be broadcasted, the corresponding bit in the ALL-UE-SIB-BITMAP will be set. With this indication, the UEs can judge whether they are expected to receive some SIBs. This may also be referred to as multi-stage scheduling.

In another embodiment, the so-called Value tag for indicating a SIB change (and which SIBs change) can be included in MIB as well. As discussed above, a separated indication that this SIB change is relevant for all UEs or for some or specific UEs can be included (e g ALL-UE-SIB-CHANGE-BITMAP and SOME-UE-SIB-CHANGE-BITMAP).

Although the embodiment has been explained on the basis of the SIB1 system information, in more general, system information may be transmitted potentially with a specific period, with adaptive resource allocation and with dynamic size. Moreover, this may also be used for minimum SI.

In a further embodiment, the scheduling information of on-demand SI is included in the SIB1-like system information, as is indicated at 14' transmitted by the LTE eNodeB 3 and 16' transmitted by the NR eNodeB 5.

Of course, the embodiments discussed under reference of FIGS. 2 and 3 also apply for embodiments where an anchor entity is provided.

In the following embodiments pertaining to a scenario where a UE misses the scheduling information are discussed.

Although, as also discussed above, in principle, the UE 6 has to check the availability of expected SI before it sends a request for SI, it is possible that the UE 6 will miss the scheduling information, for example, since the scheduling information is sent just after the SI request or since the UE 6 missed the latest update and has to wait another period to receive the updated SI.

In such cases, the network should typically notify the UEs in order to avoid transmitting requested SI via dedicated signaling. In the following, some embodiments pertaining to this issue are discussed. In principle, the network could also do nothing until the UEs themselves receive the updated broadcast information in MIB-like/SIB1-like blocks.

Figure 4:
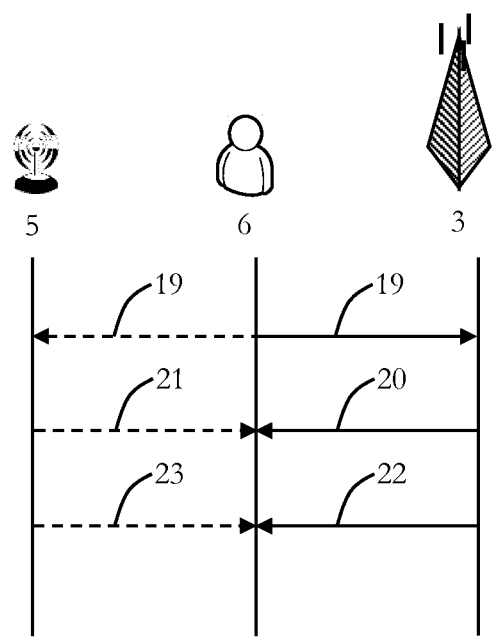
FIG. 4 illustrates a transmission scheme for system information and scheduling information.

In an embodiment, as also illustrated in FIG. 4, the network, e.g. LTE eNodeB 3 at 20 and/or NR eNodeB 5 at 21, will notify the UE 6 at to read the corresponding broadcast information transmitted at 22 by the LTE eNodeB 3 and transmitted at 23 by the NR eNodeB 5.

In more detail, for example, the UE 6 transmits a SI request message at 19 to the LTE eNodeB 3 and/or to the NR eNodeB 5. In the reply message 20 and/or 21, which follows the SI request from the UE 6 transmitted at 19, depending on the UE state, an indication will be included in the reply message 20 and/or 21 to ask the UE 6 to read the broadcast information, which is transmitted at 22 and/or 23.

For instance, if the UE 6 is in the RRC_CONNECTED UE, the indication will be carried and included in the e.g. RRC message. For the RRC_IDLE or RRC_INACTIVE UEs, the indication will be carried in e.g. the RACH message. With this indication, the UE 6 will receive the scheduling information in the broadcast information at 22 and/or 23.

Figure 5:
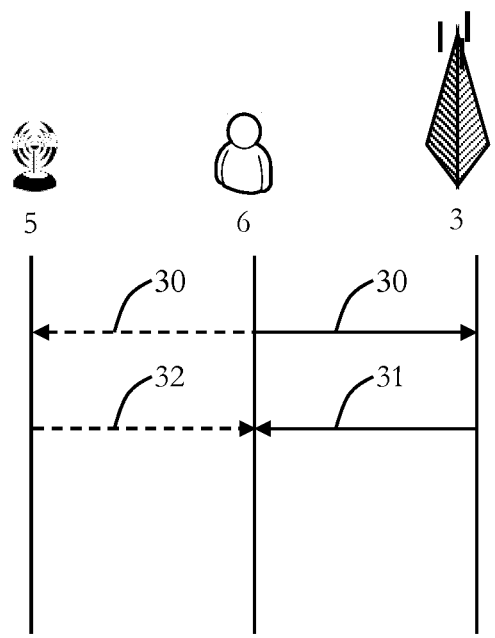
FIG. 5 illustrates a transmission scheme for system information and scheduling information.

In another embodiment, as also illustrated in FIG. 5, the UE 6 transmits at 30 a SI request to the LTE eNodeB 3 and/or to the NR eNodeB 5. The network, e.g. LTE eNodeB 3 and/or NR eNodeB 5, notifies the corresponding scheduling information of requested SI to UE 6 in the reply message followed by the SI request from the UE 6, which is transmitted, for example, at 31 by the LTE eNodeB 3 and/or at 32 by the NR eNodeB 5. Instead of an indication, as discussed above, in the present embodiment, the specific scheduling information will be included in the reply message transmitted at 31 and/or at 3.

Figure 6:
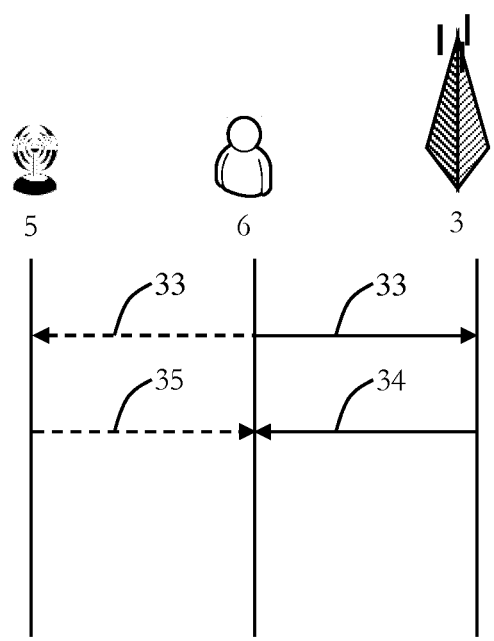
FIG. 6 illustrates a transmission scheme for system information and scheduling information.

In another embodiment, as also illustrated in FIG. 6, the network will notify the UEs 6 by a broadcast channel which can be addressed by a common ID, e.g. RAN based notification area, similar like a paging message or in the MIB. Within the message transmitted at 34 by the LTE eNodeB 3 and/or at 35 by the NR eNodeB 5, an indication is set for asking the UEs 6 to read the corresponding scheduling information.

This indication is different for the system information change and for a current paging message.

This embodiment may be adopted in the case that network continuously receives the SI request at 33 after certain SIBs have already being scheduled.

Figure 7:
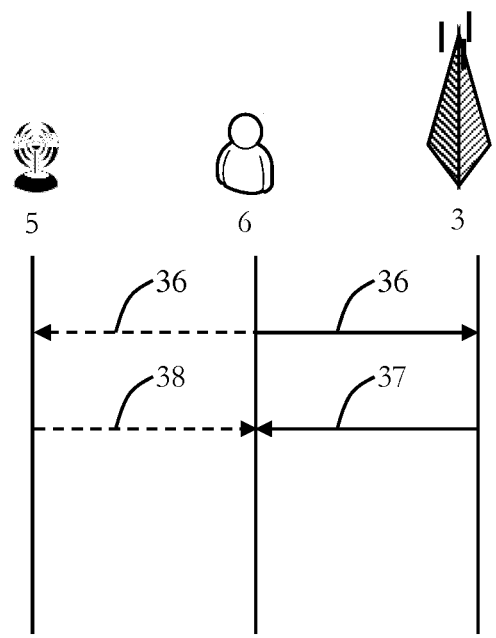
FIG. 7 illustrates a transmission scheme for system information and scheduling information.

In another embodiment, as also illustrated in FIG. 7, the UE 6 sends the channel quality, coverage, BLER (block error ration), etc. together with a SI request at 36.

After receiving it, the network, e.g. LTE eNodeB 3 and/or NR eNodeB 5, may adjust the redundancy level, periodicity and/or SIBs transmission start point, accordingly or it may boost with beamforming for specific UEs 6 at 37 and/or 38, respectively.

In the following, embodiments employing an anchor entity, e.g. LTE eNodeB 3 are discussed.

In such embodiments, where an anchor entity transmits or broadcasts the SI, the anchor entity can also send the scheduling information instead of each individual entity. For instance, the LTE eNodeB 3 (FIG. 1) transmits the scheduling information also for the NR eNodeBs 5a-c.

As also mentioned above, if the on-demand SI will be scheduled on an anchor SI entity only, then all the embodiments as discussed above for FIGS. 2 and 3 can implemented for the anchor SI entity.

In the following, embodiments are discussed, where the on-demand SI is only scheduled on an individual entity, such as LTE eNodeB 3 or NR eNodeB 5.

Figure 8:
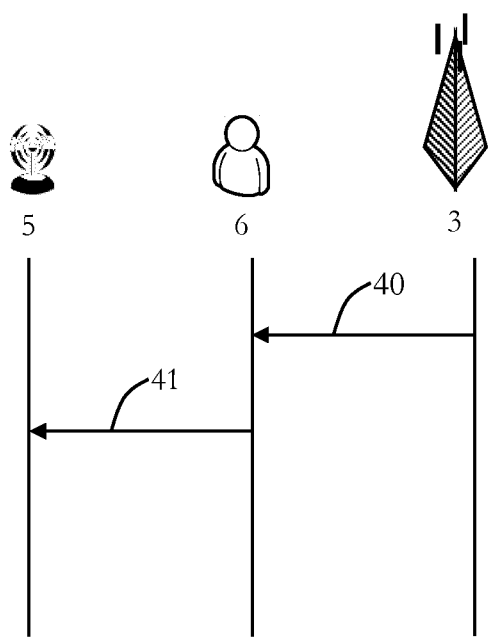
FIG. 8 illustrates a transmission scheme for system information and scheduling information.

In an embodiment, as also illustrated FIG. 8, in the MIB-like SI of the anchor cell 2 established by the LTE eNodeB 3, the indication of other cells' (e.g. 4a, 4b or 4c in FIG. 1) scheduling information will be set, and scheduling information of on-demand SI, such as cell ID, SIB identifier, periodicity etc., will be included in the SIB1-like system information of the anchor cell which is transmitted at 40 by the anchor entity, i.e. LTE eNodeB 3 in the present embodiment.

The indication in the MIB-like SI only indicates that there is another SI scheduling, but it does not indicate any further information, e.g. about which cell and what kind of SIBs will be scheduled. The UEs 6 who want to send the SI request or already sent the SI request, e.g. at 41, should check by themselves.

Figure 9:
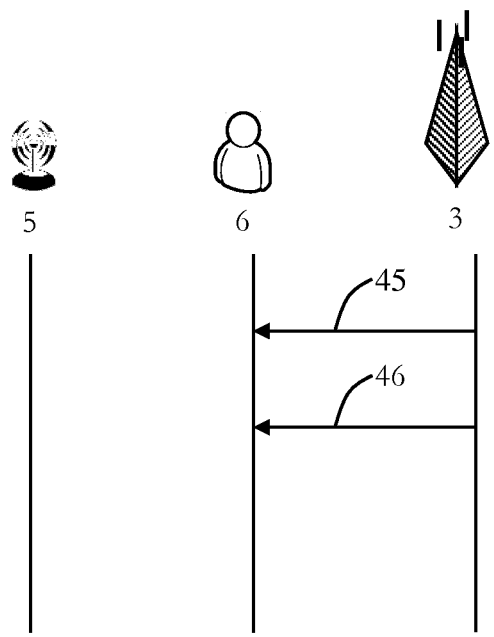
FIG. 9 illustrates a transmission scheme for system information and scheduling information.

In another embodiment, as also illustrated in FIG. 9, a (first) part of scheduling information will be included in the MIB-like SI sent at 45 from the anchor cell 2 established by the anchor entity (e.g. LTE eNodeB 3) and the detailed scheduling information will be included in the SIB1-like SI sent at 45 from the anchor cell 2 (anchor entity 3).

The information included in the MIB-like SI is the scheduling information for the scheduled SIBs and for the corresponding cell ID etc. The UE 6 can decide whether to receive the corresponding detailed scheduling information according to the indication in MIB-like SI. The basic design principle corresponds to the principle discussed above under reference of FIG. 3.

Figure 10:
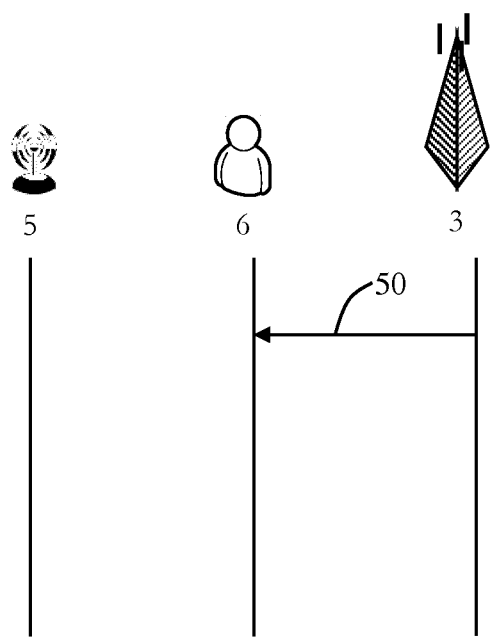
FIG. 10 illustrates a transmission scheme for system information and scheduling information.

In another embodiment, as also illustrated in FIG. 10, the scheduling information is broadcasted at 50 over a broadcast channel of the anchor entity, e.g. LTE eNodeB 3, which can be addressed by a common ID, such as the system information area identifier mentioned above.

The corresponding scheduling information will be sent at 50 via a specific broadcast channel and all the UEs 6 in the specific area e.g. system information area will share a common ID and can, thus, receive the notification message.

Some embodiments focus on system information transmission/reception for future communication systems. With the schemes of some embodiments discussed, the signaling overhead to receive system information may be reduced and the SI transmission/reception efficiency may be improved.

In the following, an embodiment of a general purpose computer 130 is described under reference of FIG. 11. The computer 130 can be implemented such that it can basically function as any type of entity, base station or new radio base station, transmission and reception point, or user equipment as described herein. The computer has components 131 to 140, which can form a circuitry, such as any one of the circuitries of the entities, base stations, and user equipments, as described herein.

Embodiments which use software, firmware, programs or the like for performing the methods as described herein can be installed on computer 130, which is then configured to be suitable for the concrete embodiment.

The computer 130 has a CPU 131 (Central Processing Unit), which can execute various types of procedures and methods as described herein, for example, in accordance with programs stored in a read-only memory (ROM) 132, stored in a storage 137 and loaded into a random access memory (RAM) 133, stored on a medium 140 which can be inserted in a respective drive 139, etc.

The CPU 131, the ROM 132 and the RAM 133 are connected with a bus 141, which in turn is connected to an input/output interface 134. The number of CPUs, memories and storages is only exemplary, and the skilled person will appreciate that the computer 130 can be adapted and configured accordingly for meeting specific requirements which arise, when it functions as a base station, and user equipment.

At the input/output interface 134 several components are connected: an input 135, an output 136, the storage 137, a communication interface 138 and the drive 139, into which a medium 140 (compact disc, digital video disc, compact flash memory, or the like) can be inserted.

The input 135 can be a pointer device (mouse, graphic table, or the like), a keyboard, a microphone, a camera, a touchscreen, etc.

The output 136 can have a display (liquid crystal display, cathode ray tube display, light emittance diode display, etc.), loudspeakers, etc.

The storage 137 can have a hard disk, a solid state drive and the like.

The communication interface 138 can be adapted to communicate, for example, via a local area network (LAN), wireless local area network (WLAN), mobile telecommunications system (GSM, UMTS, LTE, etc.), Bluetooth, infrared, etc.

It should be noted that the description above only pertains to an example configuration of computer 130. Alternative configurations may be implemented with additional or other sensors, storage devices, interfaces or the like. For example, the communication interface 138 may support other radio access technologies than the mentioned UMTS and LTE.

When the computer 130 functions as a base station, the communication interface 138 can further have a respective air interface (providing e.g. E-UTRA protocols OFDMA (downlink) and SC-FDMA (uplink)) and network interfaces (implementing for example protocols such as S1-AP, GTP-U, S1-MME, X2-AP, or the like). Moreover, the computer 130 may have one or more antennas and/or an antenna array. The present disclosure is not limited to any particularities of such protocols.

The methods as described herein are also implemented in some embodiments as a computer program causing a computer and/or a processor and/or a circuitry to perform the method, when being carried out on the computer and/or processor and/or circuitry. In some embodiments, also a non-transitory computer-readable recording medium is provided that stores therein a computer program product, which, when executed by a processor/circuitry, such as the processor/circuitry described above, causes the methods described herein to be performed.

It should be recognized that the embodiments describe methods with an exemplary ordering of method steps. The specific ordering of method steps is, however, given for illustrative purposes only and should not be construed as binding. For example, the ordering in FIGS. 2 to 11 may be exchanged.

Figure 11:
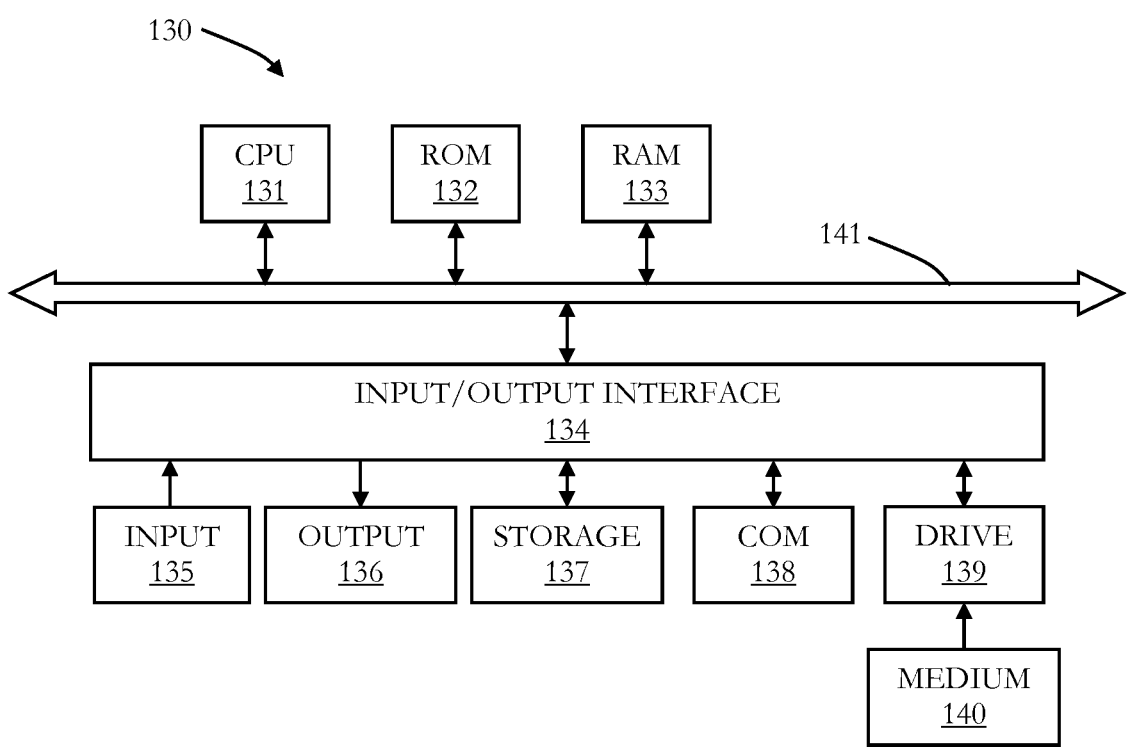
FIG. 11 illustrates schematically a general purpose computer which may be used for implementing an entity or user equipment as described herein.

Please note that the division of the control or circuitry of FIG. 11 into units 131 to 140 is only made for illustration purposes and that the present disclosure is not limited to any specific division of functions in specific units. For instance, at least parts of the circuitry could be implemented by a respective programmed processor, field programmable gate array (FPGA), dedicated circuits, and the like.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A mobile telecommunications system entity for a mobile telecommunications system including at least one entity serving at least one user equipment, comprising circuitry configured to:
   transmit scheduling information for on-demand system information, which can be requested by the at least one user equipment.

(2) The mobile telecommunications system entity of (1), wherein the circuitry is further configured to transmit the scheduling information with a predetermined periodicity.

(3) The mobile telecommunications system entity of (1) or (2), wherein the circuitry is further configured to transmit the scheduling information with a predetermined duration.

(4) The mobile telecommunications system entity of anyone of (1) to (3), wherein the circuitry is further configured to transmit the scheduling information at a predetermined transmission time.

(5) The mobile telecommunications system entity of anyone of (1) to (4), wherein the circuitry is further configured to transmit the scheduling information included in system information.

(6) The mobile telecommunications system entity of (5), wherein scheduling information is included in a master information block of the system information.

(7) The mobile telecommunications system entity of (5) or (6), wherein the scheduling information is included in a system information block of the system information.

(8) The mobile telecommunications system entity of anyone of (1) to (7), wherein the scheduling information is divided at least in a first part and a second part.

(9) The mobile telecommunications system entity of (8), wherein the first part includes information about a time schedule according to which the second part is transmitted.

(10) The mobile telecommunications system entity of (8) or (9), wherein the first part is included in a master information block of system information and the second part is included in a system information block of system information.

(11) The mobile telecommunications system entity of (10), wherein the first part indicates a time schedule according to which system information block information is transmitted.

(12) The mobile telecommunications system entity of (10) or (11), wherein the first part indicates a time schedule for bits in the system information block.

(13) The mobile telecommunications system entity of anyone of (1) to (12), wherein the circuitry is further configured to transmit information indicating whether the system information is addressed to all user equipments or to specific user equipments.

(14) The mobile telecommunications system entity of anyone of (1) to (13), wherein the circuitry is further configured to transmit information indicating a change of a system information block.

(15) The mobile telecommunications system entity of (14), wherein the information is included in a master information block.

(16) The mobile telecommunications system entity of (14) or (15), wherein the circuitry is further configured to transmit information, whether the change of the system information block is addressed to all user equipments or to specific user equipments.

(17) The mobile telecommunications system entity of anyone of (1) to (16), wherein the scheduling information is transmitted within a system information block.

(18) A mobile telecommunications system entity for a mobile telecommunications system including at least one entity serving at least one user equipment, comprising circuitry configured to:
   transmit, in response to a request for system information from a user equipment, indication information indicating to the user equipment to receive broadcast information.

(19) The mobile telecommunications system entity of (18), wherein the broadcast information includes scheduling information.

(20) The mobile telecommunications system entity of (18) or (19), wherein the indication information is transmitted based on a connection state of the user equipment.

(21) The mobile telecommunications system entity of (20), wherein the indication information is transmitted in a radio resource control message, when the user equipment is in a radio resource control connected state.

(22) The mobile telecommunications system entity of (20), wherein the indication information is transmitted in a random access channel message, when the user equipment is in a radio resource control inactive state or idle state.

(23) A mobile telecommunications system entity for a mobile telecommunications system including at least one entity serving at least one user equipment, comprising circuitry configured to:
   transmit, in response to a request for system information from a user equipment, scheduling information to the user equipment.

(24) A mobile telecommunications system entity for a mobile telecommunications system including at least one entity serving at least one user equipment, comprising circuitry configured to:
   transmit over a broadcast channel, in response to a request for system information from a user equipment, indication information indicating to the user equipment to receive scheduling information.

(25) The mobile telecommunications system entity of (24), wherein the broadcast channel is addressed, based on a radio access network area or wherein the broadcast channel is addressed in a master information block.

(26) The mobile telecommunications system entity of (24) or (25), wherein the circuitry is further configured to transmit information, which indicates to the at least one user equipment to read the scheduling information.

(27) A mobile telecommunications system entity for a mobile telecommunications system including at least one entity serving at least one user equipment, comprising circuitry configured to:
   receive a system information request from the at least one user equipment and receive at least one of: channel quality, coverage and block error rate information; and
   adjust at least one of redundancy level, periodicity of transmission, transmission start point and boost with beamforming for the at least one user equipment.

(28) A mobile telecommunications system anchor entity including at least one entity serving at least one user equipment, the anchor entity comprising circuitry configured to:
   transmit scheduling information for on-demand system information, which can be requested by the at least one user equipment and which is transmitted by the at least one entity serving the at least one user equipment.

(29) The mobile telecommunications system anchor entity of (28), wherein the circuitry is further configured to transmit the scheduling information with a predetermined periodicity.

(30) The mobile telecommunications system anchor entity of (28) or (29), wherein the circuitry is further configured to transmit the scheduling information with a predetermined duration.

(31) The mobile telecommunications system anchor entity of anyone of (28) to (30), wherein the circuitry is further configured to transmit the scheduling information at a predetermined transmission time.

(32) The mobile telecommunications system anchor entity of anyone of (28) to (31), wherein the circuitry is further configured to transmit indication information that the scheduling information for the at least one entity serving the at least one user equipment is included in system information.

(33) The mobile telecommunications system anchor entity of (32), wherein the indication information is included in a master information block of the system information.

(34) The mobile telecommunications system anchor entity of (32) or (33), wherein the scheduling information is included in a system information block of the system information.

(35) The mobile telecommunications system anchor entity of anyone of (28) to (34), wherein the scheduling information is divided at least in a first part and a second part.

(36) The mobile telecommunications system anchor entity of (35), wherein the first part includes information about a time schedule according to which the second part is transmitted.

(37) The mobile telecommunications system anchor entity of (35) or (36), wherein the first part is included in a master information block of system information and the second part is included in a system information block of system information.

(38) The mobile telecommunications system anchor entity of (37), wherein the first part indicates a time schedule according to which system information block information is transmitted.

(39) The mobile telecommunications system anchor entity of (37) or (38), wherein the first part indicates a time schedule for bits in the system information block.

(40) The mobile telecommunications system anchor entity of anyone of (28) to (39), wherein the scheduling information is transmitted over a broadcast channel of the anchor entity, the broadcast channel having a predefined identifier.

(41) The mobile telecommunications system anchor entity of (40), wherein the predefined identifier is a system information area identifier.

(42) The mobile telecommunications system anchor entity of (41), wherein all user equipments within the system information area have a common identifier and wherein the scheduling information is directed to the user equipments having the common identifier.

The invention claimed is:

1. A mobile telecommunications system entity for a mobile telecommunications system including at least one entity serving at least one user equipment, comprising circuitry configured to:
   transmit scheduling information for on-demand system information, which can be requested by the at least one user equipment, and
   in response to the at least one user equipment missing the scheduling information, notify the at least one user equipment by a broadcast channel which can be addressed by a common ID to read the corresponding scheduling information.

2. The mobile telecommunications system entity of claim 1, wherein the circuitry is further configured to transmit the scheduling information with a predetermined periodicity.

3. The mobile telecommunications system entity of claim 1, wherein the circuitry is further configured to transmit the scheduling information with a predetermined duration.

4. The mobile telecommunications system entity of claim 1, wherein the circuitry is further configured to transmit the scheduling information at a predetermined transmission time.

5. The mobile telecommunications system entity of claim 1, wherein the circuitry is further configured to transmit the scheduling information included in system information.

6. The mobile telecommunications system entity of claim 5, wherein scheduling information is included in a master information block of the system information.

7. The mobile telecommunications system entity of claim 5, wherein the scheduling information is included in a system information block of the system information.

8. A mobile telecommunications system entity for a mobile telecommunications system including at least one entity serving at least one user equipment, comprising circuitry configured to:
   transmit, in response to a request for system information from a user equipment, indication information indicating to the user equipment to receive broadcast information, wherein the indication information is transmitted based on a connection state of the user equipment,
   wherein the circuitry for transmitting the indication information is further configured to
      in response to the user equipment being in a radio resource control (RRC) connected state, transmit the indication information in an RRC message, and
      in response to the user equipment being in an RRC inactive state or an RRC idle state, transmit the indication information in a random access channel (RACH) message.

9. The mobile telecommunications system entity of claim 8, wherein the broadcast information includes scheduling information.

10. A mobile telecommunications system entity for a mobile telecommunications system including at least one entity serving at least one user equipment, comprising circuitry configured to:
    transmit over a broadcast channel, in response to a request for system information from a user equipment, indication information indicating to the user equipment to receive scheduling information, and
    in response to the user equipment missing the scheduling information, notify the user equipment to read the corresponding broadcast information.

11. The mobile telecommunications system entity of claim 10, wherein the broadcast channel is addressed, based on a radio access network area or wherein the broadcast channel is addressed in a master information block.

12. A mobile telecommunications system entity for a mobile telecommunications system including at least one entity serving at least one user equipment, comprising circuitry configured to:
    receive a system information request from the at least one user equipment and receive at least one of: channel quality, coverage and block error rate information; and adjust at least one of redundancy level, periodicity of transmission, transmission start point and boost with beamforming for the at least one user equipment.

13. A mobile telecommunications system anchor entity including at least one entity serving at least one user equipment, the anchor entity comprising circuitry configured to:
   transmit scheduling information for on-demand system information, which can be requested by the at least one user equipment and which is transmitted by the at least one entity serving the at least one user equipment, and
   in response to the at least one user equipment missing the scheduling information, notify the at least one user equipment by a broadcast channel which can be addressed by a common ID to read the corresponding scheduling information.

14. The mobile telecommunications system anchor entity of claim 13, wherein the circuitry is further configured to transmit the scheduling information with a predetermined periodicity.

15. The mobile telecommunications system anchor entity of claim 13, wherein the circuitry is further configured to transmit the scheduling information with a predetermined duration.

16. The mobile telecommunications system anchor entity of claim 13, wherein the circuitry is further configured to transmit the scheduling information at a predetermined transmission time.

17. The mobile telecommunications system anchor entity of claim 13, wherein the circuitry is further configured to transmit indication information that the scheduling information for the at least one entity serving the at least one user equipment is included in system information.

18. The mobile telecommunications system anchor entity of claim 17, wherein the indication information is included in a master information block of the system information.

19. The mobile telecommunications system anchor entity of claim 17, wherein the scheduling information is included in a system information block of the system information.

* * * * *